(12) United States Patent
Fomin et al.

(10) Patent No.: US 10,308,457 B2
(45) Date of Patent: Jun. 4, 2019

(54) CAPACITIVE SENSING FOR PAPER TRAY

(71) Applicant: Texas Instruments Incorporated, Dallas, TX (US)

(72) Inventors: Evgeny Fomin, San Carlos, CA (US); Alfred Gomes, Sunnyvale, CA (US); Domenico Granozio, Borgarello (IT); Matthew Christopher Kessler, Denver, CO (US); Scott D. Kulchycki, Mountian View, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 859 days.

(21) Appl. No.: 14/568,675

(22) Filed: Dec. 12, 2014

(65) Prior Publication Data

US 2015/0168328 A1      Jun. 18, 2015

Related U.S. Application Data

(60) Provisional application No. 61/915,036, filed on Dec. 12, 2013, provisional application No. 61/932,394, filed on Jan. 28, 2014.

(51) Int. Cl.
*B65H 7/02* (2006.01)
*G01B 7/06* (2006.01)

(52) U.S. Cl.
CPC ............... *B65H 7/02* (2013.01); *G01B 7/082* (2013.01); *B65H 2511/10* (2013.01); *B65H 2511/11* (2013.01); *B65H 2511/12* (2013.01); *B65H 2511/152* (2013.01); *B65H 2511/30* (2013.01); *B65H 2515/712* (2013.01); *B65H 2553/23* (2013.01)

(58) Field of Classification Search
CPC ........................................................ B65H 7/02
See application file for complete search history.

(56) References Cited

U.S. PATENT DOCUMENTS

| | | | | |
|---|---|---|---|---|
| 4,610,530 A | * | 9/1986 | Lehmbeck | G01N 27/223 399/45 |
| 5,168,239 A | * | 12/1992 | Winship | G01B 7/087 324/606 |
| 5,635,962 A | * | 6/1997 | Goldis | B41J 2/17566 347/7 |
| 2003/0231024 A1 | * | 12/2003 | Luque | B65H 7/02 324/658 |
| 2007/0144795 A1 | * | 6/2007 | Tran | G06F 3/044 178/18.06 |
| 2010/0292945 A1 | * | 11/2010 | Reynolds | G06F 3/044 702/65 |

(Continued)

*Primary Examiner* — Manuel L Barbee
*Assistant Examiner* — Raymond L Nimox
(74) *Attorney, Agent, or Firm* — Andrew Viger; Charles A. Brill; Frank D. Cimino

(57) ABSTRACT

A capacitive sensing system based on projected self-capacitance is suitable for use in printing systems/products to sense paper tray status. In example embodiments, a capacitive sensing system is adapted for sensing the condition/characteristics of paper in the paper tray, such as paper size, stack height and page count and paper dielectric. The capacitive sensing system can be configured with one or more shielded capacitive sensors incorporated into the paper tray, and oriented relative to the paper according to the paper condition/characteristic sensed.

18 Claims, 7 Drawing Sheets

(56) References Cited

U.S. PATENT DOCUMENTS

2012/0025851 A1* 2/2012 Homeijer ............ G01D 5/2412
324/686
2012/0286808 A1* 11/2012 Fergen .................... G06F 3/044
324/658

* cited by examiner

| Cdiff_no PAPER (pF) | CA_0 (pF) | CA_1 (pF) | CDIFF (pF) | a1 (mm) | a2 (mm) | PAPER SIZE | NUMBER OF PAGES | SAMPLING RATE |
|---|---|---|---|---|---|---|---|---|
| -3.40E-01 | 1.19E+00 | 1.89 | -1.10E-01 | 69.83 | 34.17 | A4 | 14 | 13.2 Hz |
| -3.40E-01 | 1.19E+00 | 1.657 | -2.25E-01 | 78.39 | 25.61 | LETTER | 14 | 13.2 Hz |
| -3.93E-01 | 1.22E+00 | 1.414 | -3.29E-01 | 69.33 | 34.67 | A4 | 10 | 13.2 Hz |
| -3.93E-01 | 1.22E+00 | 1.496 | -3.23E-01 | 77.43 | 26.57 | LETTER | 10 | 13.2 Hz |

CAPACITIVE SENSING FOR PAPER TRAY

CROSS-REFERENCE TO RELATED APPLICATIONS

Priority is claimed under USC § 119(e) to: (a) U.S. Provisional Application 61/915,036, filed 12 Dec. 2013, and (b) US Provisional Application 61/932,394, filed 28 Jan. 2014.

BACKGROUND

Technical Field

This Patent Document relates generally to printing systems/products that include sheet feeding from a paper tray.

Related Art

Printing systems/products that provide printed (paper) output, typically include sheet feeding apparatus. The sheet feeding apparatus feeds paper to a printing apparatus from a paper tray.

These printing systems/products commonly include various mechanical or electronic mechanisms to determine the condition or characteristics of paper in the tray. For example, paper tray sensing mechanism can be used to determine paper quantity and paper size.

BRIEF SUMMARY

This Brief Summary is provided as a general introduction to the Disclosure provided by the Detailed Description and Figures, summarizing some aspects and features of the disclosed invention. It is not a complete overview of the Disclosure, and should not be interpreted as identifying key elements or features of the invention, or otherwise characterizing or delimiting the scope of the invention disclosed in this Patent Document.

The Disclosure describes apparatus and methods for capacitive sensing for paper tray status (paper condition/characteristics), such as paper size, paper stack height, page count and paper dielectric.

According to aspects of the Disclosure, measuring paper characteristics for paper within a paper tray using capacitive sensing. The paper tray is configured with at least two capacitive sensors with respective capacitive electrodes CIN1 and CIN2, each with a ground plane at a paper tray bottom, with CIN1 and CIN2 at a top of the paper tray oriented relative to a width dimension of the paper in the paper tray such that the paper covers CIN1, and partially covers CIN2, and with CIN2 having a length $a2=a2p+a2a$, where $a2p$ is a portion of the CIN2 length $a2$ that is over the paper, and $a2a$ is a portion of the CIN2 length $a$ that is not over the paper. The method can include: (a) with no paper in the paper tray, measuring a capacitance CA0=CIN1 to the ground plane; (b) with paper in the paper tray, measuring a capacitance CA1=CIN1 to ground; (c) measuring a capacitance CA2=CIN2 to ground; and (d) determining $CDIFF\_w = CA1*(1-a2p/a2) - CA0*(aa/a)$; and (e) determining paper width based on (1) $a2=a2p+a2a$, (2) $a2p=a2-a2a$, and (3) $a2a=(a2*CDIFF\_w)/(CA1-CA0)$. Paper width corresponds to a percentage $(a2p/a)$ of CIN2 covered by paper.

Other aspects and features of the invention claimed in this Patent Document will be apparent to those skilled in the art from the following Disclosure.

DETAILED DESCRIPTION

This Description and the Figures disclose example embodiments and applications that illustrate various features and advantages of a capacitive system for sensing paper tray status.

In brief overview, a capacitive sensing system is based on projected self-capacitance. In example embodiments, the capacitive sensing system can be configured with one or more shielded capacitive sensors incorporated into the paper tray, and oriented relative to the paper according to the paper condition/characteristic sensed.

Figures 1, 2C:
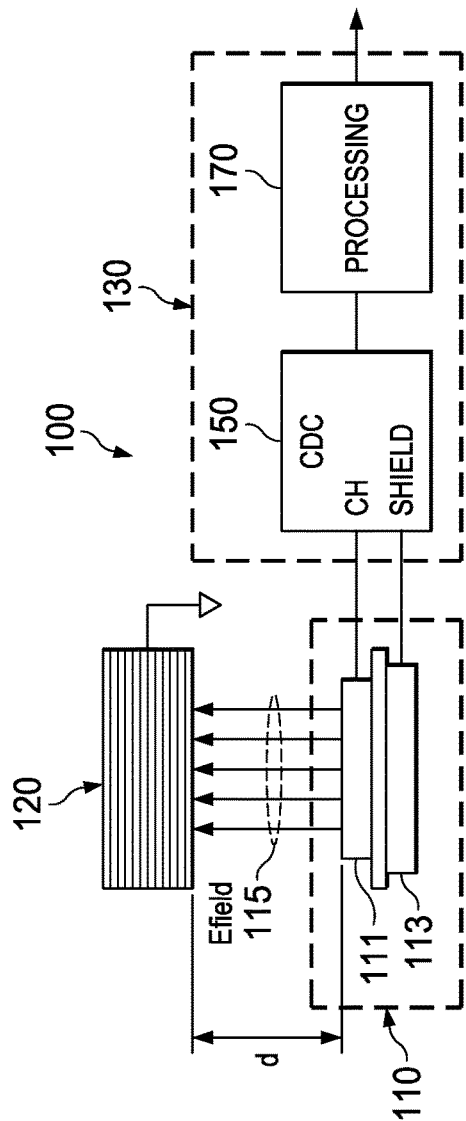
FIG. 1 is an example functional illustration of a capacitive sensing system based on projected self-capacitance, adaptable for use in printing systems/products to sense the condition/characteristics of paper in the paper tray, such as paper size and paper stack height (page count), and to determine paper type (paper dielectric).
FIGS. 2A, 2B and 2C illustrates an example embodiment of a paper tray with capacitive sensing for measuring paper size/width, including: (2A/B) top and side views illustrating a paper tray incorporating a capacitive sensor, including capacitive electrodes CIN1 and CIN2, and (2C) example capacitive sensing results.

FIG. 1 is an example functional illustration of a capacitive sensing system 100 suitable for use in printing systems/products, and in particular, for use in sensing paper tray status. More particularly, capacitive sensing system 100 is adapted to embodiments of the invention used to sense the condition/characteristics of paper in the paper tray, such as paper size, paper stack height, page count and paper dielectric.

Capacitive sensing system 100 includes a capacitive sensor 110 and capacitance acquisition/conversion 130 formed by a capacitance-to-digital conversion (CDC) unit 150, and a data processor 170.

In example embodiments, capacitive sensor 110 is adapted for incorporation into a paper tray, and configured for capacitive sensing of condition/characteristics of paper 120. The capacitive sensor 110 need not be co-located with the CDC unit 150, but to reduce the effects of parasitic capacitance, CDC 150 is preferably located as close as possible to capacitive sensor 110.

Capacitive sensing system 100 is configured for capacitive sensing based on projected self-capacitance. Capacitive sensor 110 includes a sensor electrode 111 and a driven sensor shield 113, separately coupled to CDC 150 (Acquisition Channel input CH and Shield Excitation/Driver output SHIELD).

Capacitive sensor 110 includes a driven sensor shield 113, also coupled to a shield driver in CDC 150. Sensor shield 113 is disposed over, and insulated from, sensor electrode 111. Shield drive can be provided synchronously with sensor excitation frequency, and can be used to focus sensing direction, and to counteract parasitic capacitance.

CDC 150 acquires capacitance measurements from capacitive sensor 110, and converts these capacitance measurements to digital sensor data representative of paper condition/characteristics. The CDC sensor data can be input to data processor 170, and processed to provide paper tray status information.

Figure 2A:
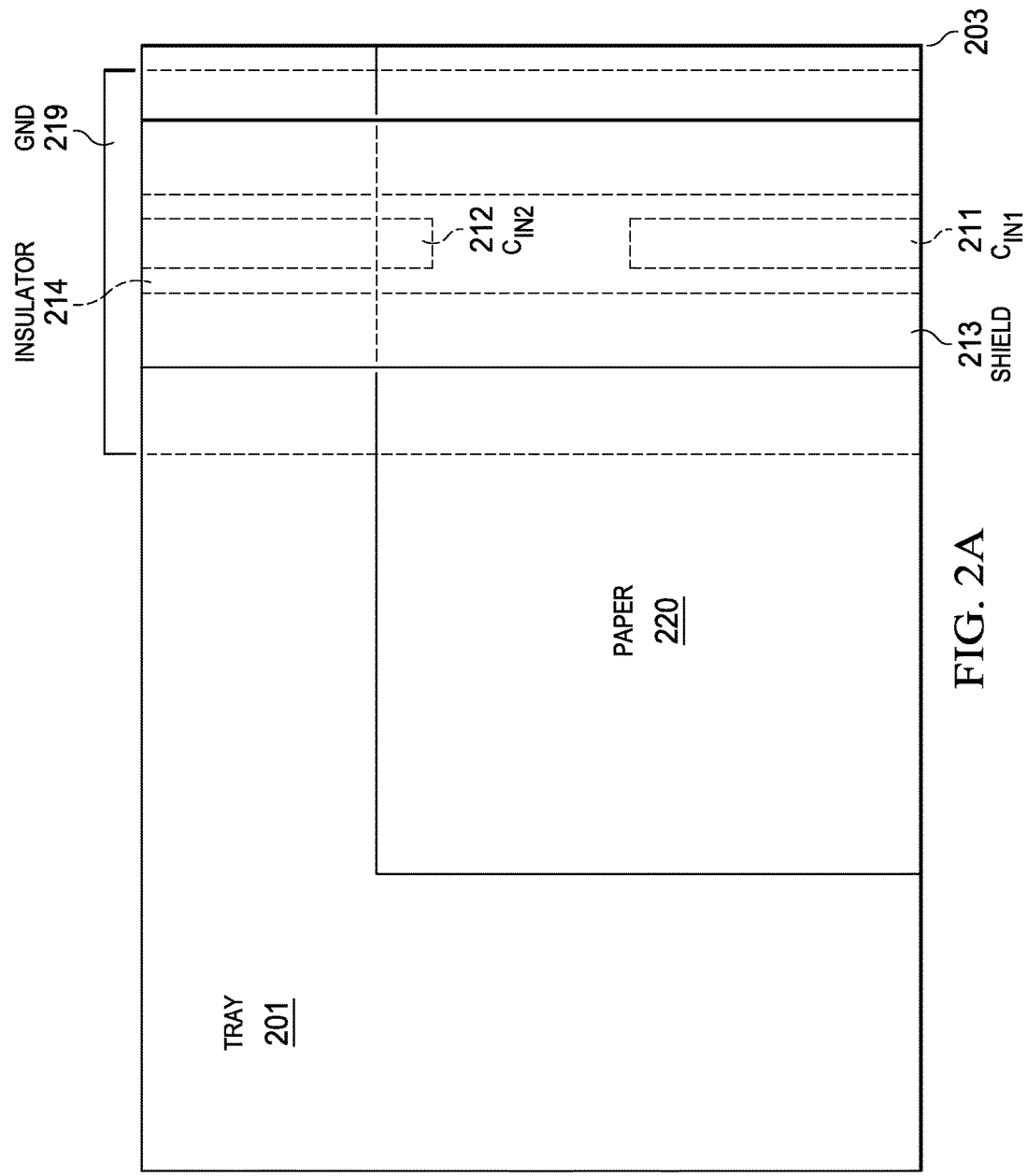
Figure 2B:
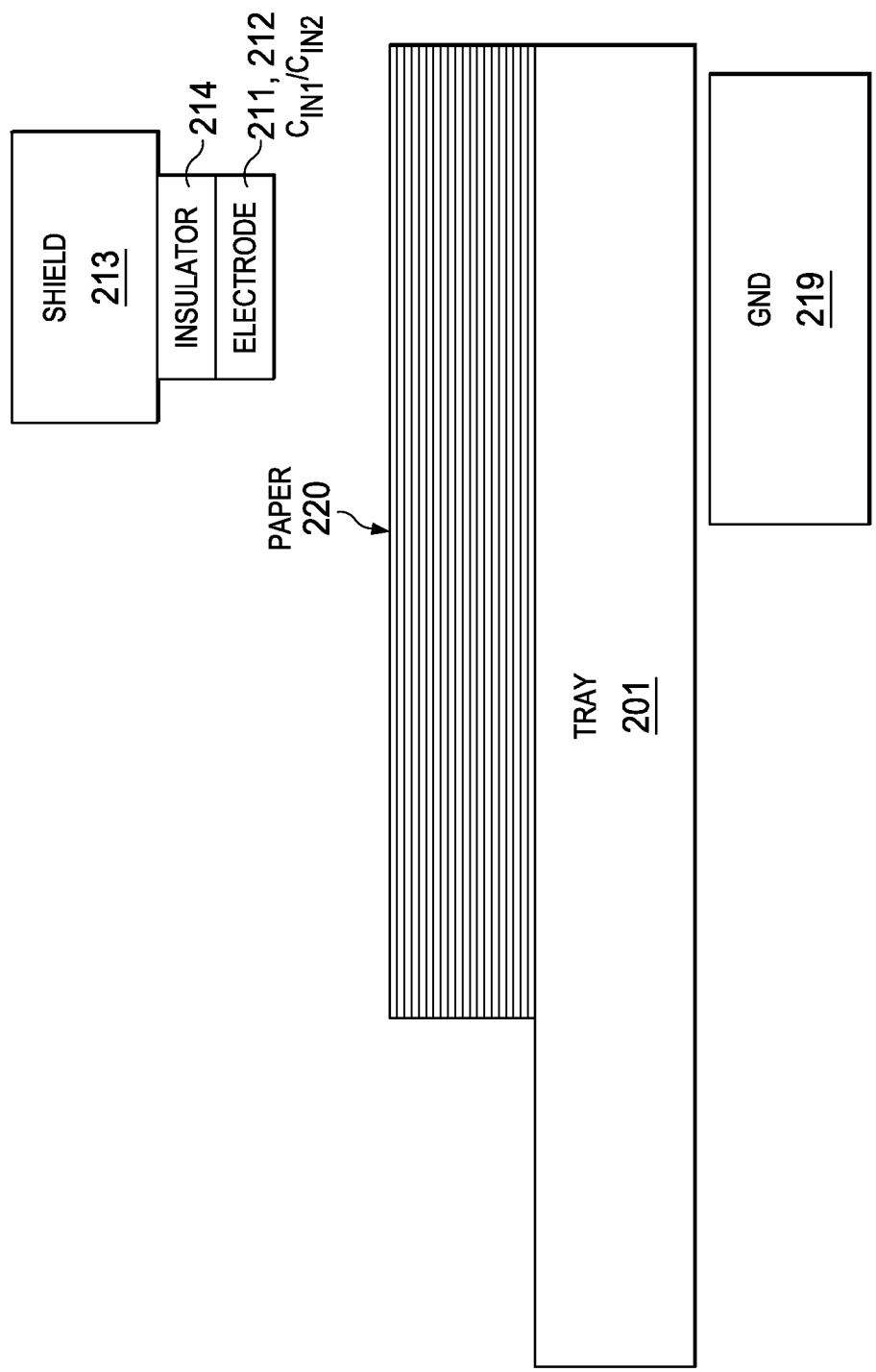

FIGS. 2A, 2B and 2C illustrates an example paper tray 201 with capacitive sensing adapted for measuring paper size/width, including a capacitive sensor with example capacitive electrodes CIN1 and CIN2 (211 and 212). The example capacitive electrodes CIN1 and CIN2 are substantially identical in configuration with a length a (a1 and a2) and width b, with an area A=a*b. The capacitive sensing system includes a capacitive sensor structure with (shielded) capacitive electrodes CIN1 and CIN2 configured for capacitance measurements of paper size/width based on projected self-capacitance.

FIGS. 2A and 2B are top and side views that illustrate an example arrangement for the elements of the capacitive sensor incorporated with a paper tray 201, and in particular, the placement of the capacitive electrodes CIN1 and CIN2 relative to the paper 220, which is aligned within the tray at 203. Specifically, capacitive sensor/electrode CIN1 is positioned so that it is covered by paper 220 in tray 201, and capacitive sensor/electrode CIN2 is positioned relative to the width dimension of the paper so that it is partially covered by paper 220 in tray 201: CIN2 has a length a2=a2p+a2a, where a2p is a portion of the CIN2 length a2 that is over the paper, and a2a is a portion of the CIN2 length a that is not over the paper.

Referring to FIG. 2B, a capacitive sensor includes capacitive electrodes CIN1 and CIN2 (211 and 212), shield 213 and insulator 214, integrated or mounted within tray 201. A ground plane 219 is spaced from the capacitive sensors CIN1 and CIN2 in the projection direction. As illustrated ground plane 219 is on the bottom side of tray 201—alternatively, the ground plane can be located within the tray, adjacent paper 201.

For paper size/width measurement, CIN1 measurements are used to calibrate for the type of paper, and combined CIN1 and CIN2 measurements are used to determine paper size/width. If CIN1 and CIN2 are not identical, CIN2 can be calibrated.

An example methodology for determining paper size/width based on capacitive sensing involves first calibrating for tray thickness and sensor size/position based on a capacitive measurement CA0=CIN1 to ground (with no paper present).

For paper size/width measurement operations, with paper present, CIN1 and CIN2 measurements are captured:

CA1=CIN1 to ground
CA2=CIN2 to ground $$CDIFF = CA1 - CA2$$

Paper width can be determined from a percentage of CIN2 covered by paper, as represented by CDIFF.

An example methodology for determining paper size/width is based on measuring CA0, CA1, and CA2, and using the following relationships:

$$CA0_0 = k * \varepsilon_0 * \varepsilon_A * \frac{a*b}{d},$$

$\varepsilon_A$ is the dielectric constant of the air, k accounts for fringing $$CA_1 = k * \varepsilon_0 * \varepsilon_P * \frac{a*b}{d}$$

where $\varepsilon_p$ is the dielectric constant of the paper, and $$CDIFF\_w = k * \varepsilon_0 * \varepsilon_P * \frac{a2p*b}{d} + k * \varepsilon_0 * \varepsilon_A * \frac{a2a*b}{d}$$

a2p is the length of the portion of CIN2 electrode covered by the paper
a2a is the length of the portion of CIN2 electrode not covered by the paper a2=a2p+a2a where CDIFF_w=CA1*(1−a2p/a2)−CA0*(aa/a)

a2p=a2−a2a a2a=(a2*CDIFF_w)/(CA1−CA0).

This methodology for determining paper size/width is independent of the dielectric of paper $\varepsilon_p$.

Referring to FIG. 2B, the capacitive sensor (shield 213, insulator 214, electrodes CIN1/CIN2 is mounted above tray 201 and paper 220, so that the sensing field projects through the paper 220 toward the ground plane 219. In an alternate configuration, the sensor can be mounted on the tray, oriented 180 degrees to the orientation illustrated, with the sensor electrodes CIN1/CIN2 adjacent paper 220.

A third capacitive sensor/electrode CIN3 can be used to measure paper length using a similar method. Capacitive sensor/electrode $C_{IN3}$ can be positioned so that it is partially covered in the length dimension by paper 220 in tray 201 (substantially as illustrated for CIN2 for the width dimension).

FIG. 2C provides example measurement results based on the following parameters:

CIN1 and CIN2 electrode length is a=104 mm (a1+a2)
Letter paper is approximately 6 mm wider than A4
Cdiff_nopaper accounts for non-identical electrodes and is subtracted from CDIFF.

Example design modifications for the configuration of the capacitive electrodes CIN1 and CIN2 include, in addition to size/perimeter, different shapes/profiles, such as spiral.

Figure 3A:
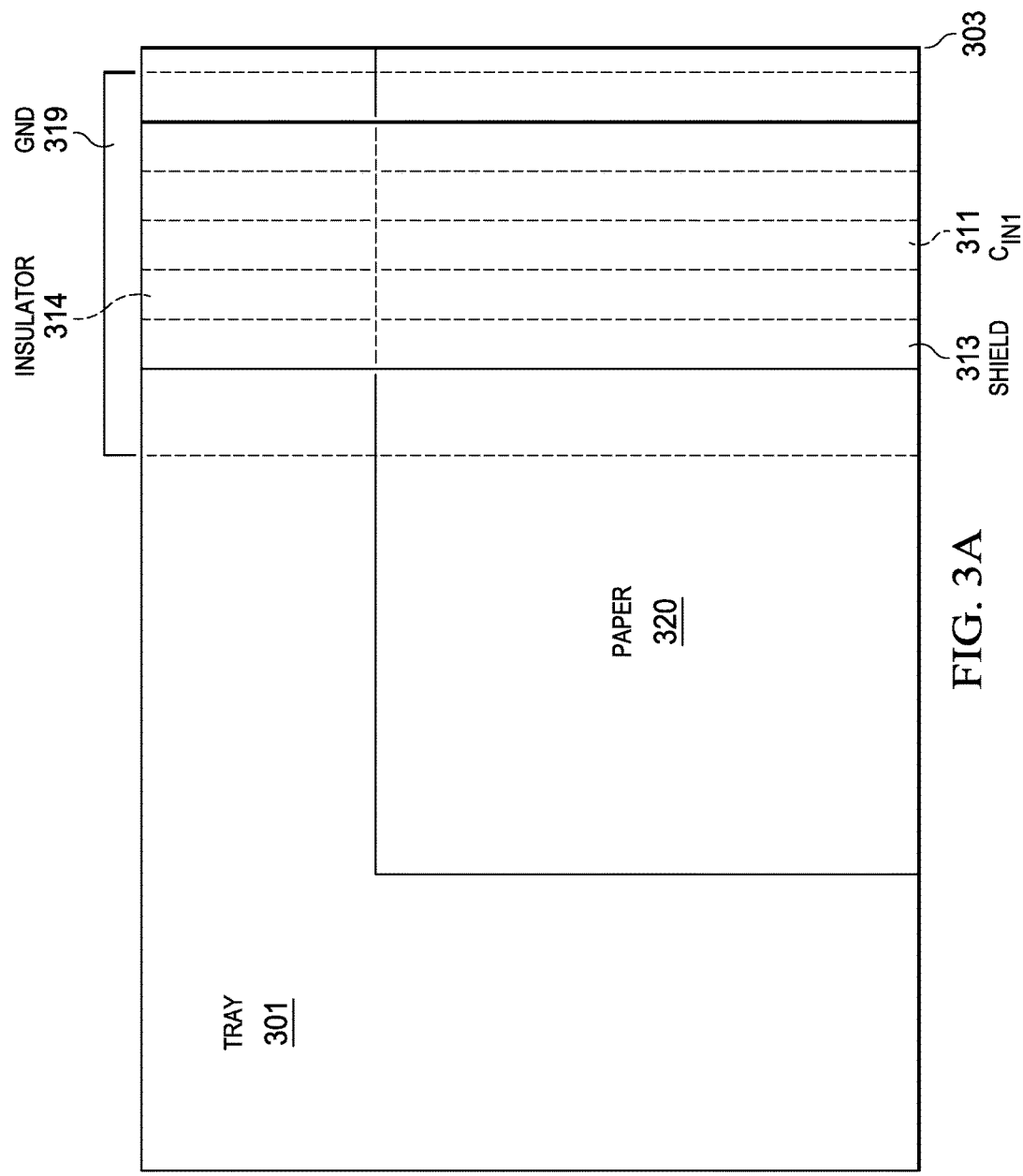
FIGS. 3A, 3B and 3C illustrate an example embodiment of a paper tray with capacitive sensing for measuring paper stack height/page count, including: (2A/B) top and side views illustrating a paper tray incorporating a capacitive sensor, including capacitive electrode CIN1, and (3C) example capacitive sensing results.
Figure 3B:
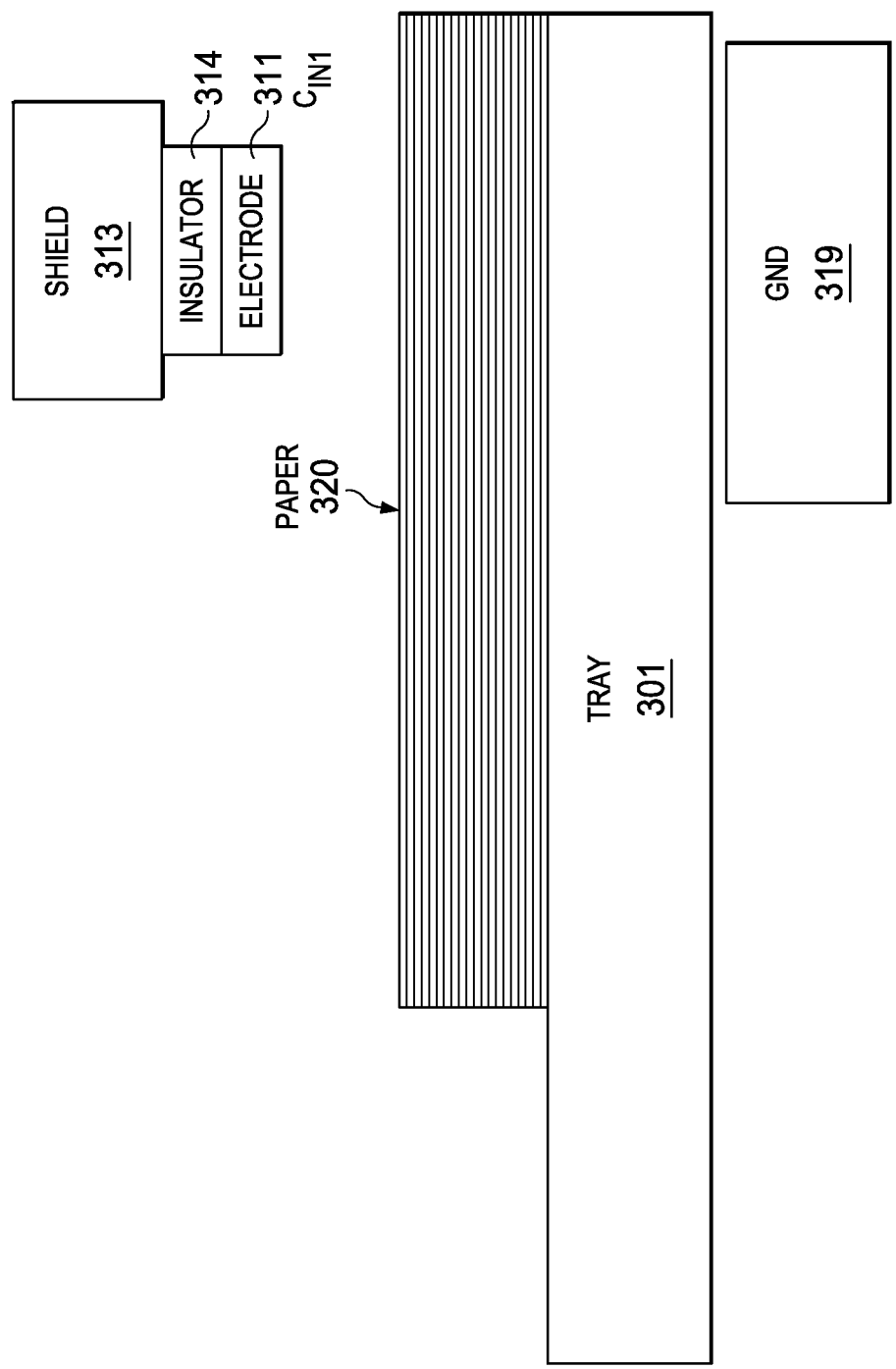
Figure 3C:
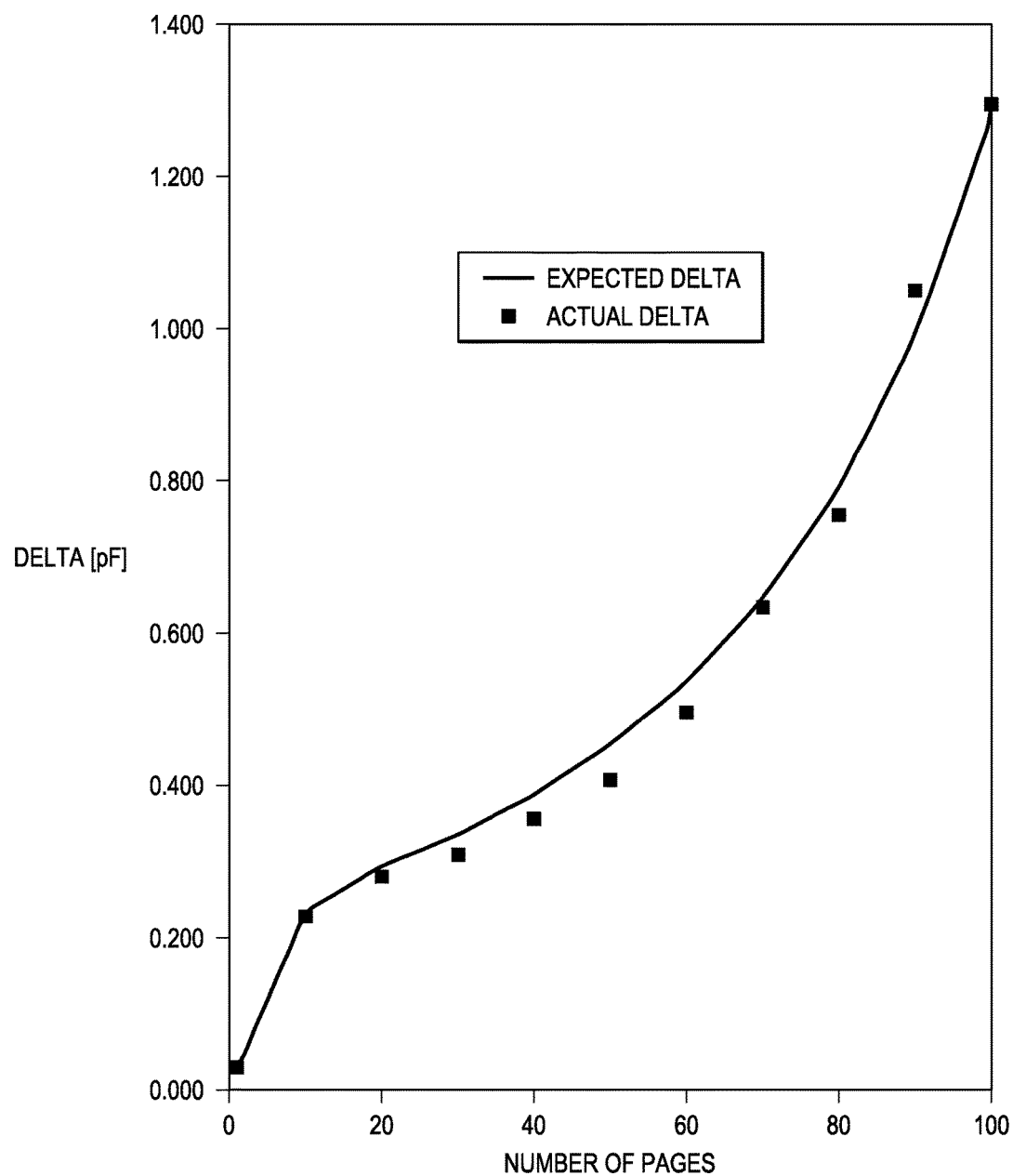

FIGS. 3A, 3B and 3C illustrates an example paper tray with capacitive sensing for measuring paper stack height and page count. The capacitive sensing system includes a capacitive sensor structure with a (shielded) capacitive electrode CIN1 (311) configured for capacitance measurements of paper stack height/page count based on projected self-capacitance.

FIGS. 3A and 3B are top and side views that illustrate an example arrangement for the elements of the capacitive sensor incorporated with a paper tray 301, and in particular, the placement of the capacitive electrode $C_{IN1}$ relative to the paper 320, which is aligned within the tray at 303. Specifically, capacitive sensor/electrode $C_{IN1}$ is positioned so that it is covered by paper 220 in tray 201.

Referring to FIG. 3B, a capacitive sensor includes a capacitive electrode CIN1 (311), shield 313 and insulator 314, integrated or mounted within tray 301. A ground plane 319 is spaced from the capacitive sensor CIN1 in the projection direction. As illustrated ground plane 319 bottom side of tray 301—alternatively, the ground plane can be located within the tray, adjacent paper 301.

An example methodology for sensing paper stack height involves first calibrating for tray thickness and sensor size/position based on a capacitive measurement CA0=CIN1 to ground with no paper present.

For stack height measurement operation, with paper present, the CIN1 measurement is captured: CA1=CIN1 to ground, which is proportional to a total thickness of paper between CIN1 and ground, i.e., total paper stack height.

Page count can be determined from an initial sheet feed. An example methodology for calculating the number of pages in the paper stack includes: (a) feed one paper sheet, and determine from capacitive measurements the change in stack height, so that (b) page count=previous stack height/change in stack height.

An example methodology for determining page count includes two determinations from the capacitance measurement CA0. First, determine capacitance CA1,0:

$$CA1,0 = (CAIR^{-1} + CPAPER^{-1})^{-1}$$
$$= \left[\frac{1}{CA0} + \frac{dp}{\varepsilon 0 A}\left(\frac{1}{\varepsilon P} - \frac{1}{\varepsilon A}\right)\right]^{-1}$$

where dp is the total thickness of paper between sensor CIN1 and ground; and where:

$$CA0 = k * \varepsilon_0 * \varepsilon_A * \frac{A}{d}$$
$$CAIR = k * \varepsilon_0 * \varepsilon_A * \frac{A}{d - dp}$$
$$CPAPER = k * \varepsilon_0 * \varepsilon p * \frac{A}{dp}$$

and where
da is the total thickness of air between the sensor and ground $$d=dp+da$$
$$da=d-dp$$

$\varepsilon_A$ is the dielectric constant of the air
k accounts for fringing
A is sensor area.

Then feed one page of paper, and determine capacitance CA1,1

$$CA1,1 = \left[\frac{1}{CA0} + \frac{(dp + d1page)}{\varepsilon 0 A}\left(\frac{1}{\varepsilon P} - \frac{1}{\varepsilon A}\right)\right]^{-1}$$

where $d_{1page}$ is the thickness of one sheet of paper.

Capacitance CA1,0 can be used to determine dp as the total thickness of paper between sensor CIN1 and ground (total stack height), and CA1,1 can be used to determine d1page is the thickness of one sheet of paper. Then page count can be determined as: page count=dp/(d1page).

This initial-sheet-feed methodology, which provides sheet thickness d1page does not require prior knowledge of the dielectric constant of the paper $\varepsilon_p$.

The dielectric constant of the paper $\varepsilon_p$ (paper type) can be determined from the above measurement for paper stack height and page count, including the determination of sheet thickness $d_{1page}$, which enables computation of the average dielectric $\varepsilon_{eff}$ between $C_{IN1}$ and GND.

Average dielectric $\varepsilon_{eff}$ and the dielectric constant of the paper $\varepsilon_p$ are related by:

$$\varepsilon_{eff} = \frac{1}{nw/d(1/\varepsilon_{paper} - 1/\varepsilon_{air}) + 1/\varepsilon_{air}}$$

where n=number of pages, w=sheet thickness (d1page), so that nw is stack height (dp), and d is the distance between the capacitive electrode CIN1 and GND.

Based on the known values:
Distance between CIN1 and GND, d
Average dielectric between CIN1 and GND, $\varepsilon_{eff}$
Number of pages in the stack n (d1page/d)
Thickness of a single sheet of paper w
paper dielectric $\varepsilon_{paper}$ (paper type) can be determined from:

$$1/\varepsilon_{paper} \frac{d\varepsilon_{air} + (nw - d)\varepsilon_{eff}}{nw \varepsilon_{eff} \varepsilon_{air}}$$

FIG. 3C provides example page count measurement results, comparing expected to actual results.

As an alternate embodiment for determining page count using an initial sheet feed (i.e., to determine sheet thickness d1page), the dielectric of the paper $\varepsilon_{paper}$ can be capacitively sensed, and page count determined if sheet thickness is known, or assumed.

Figure 4:
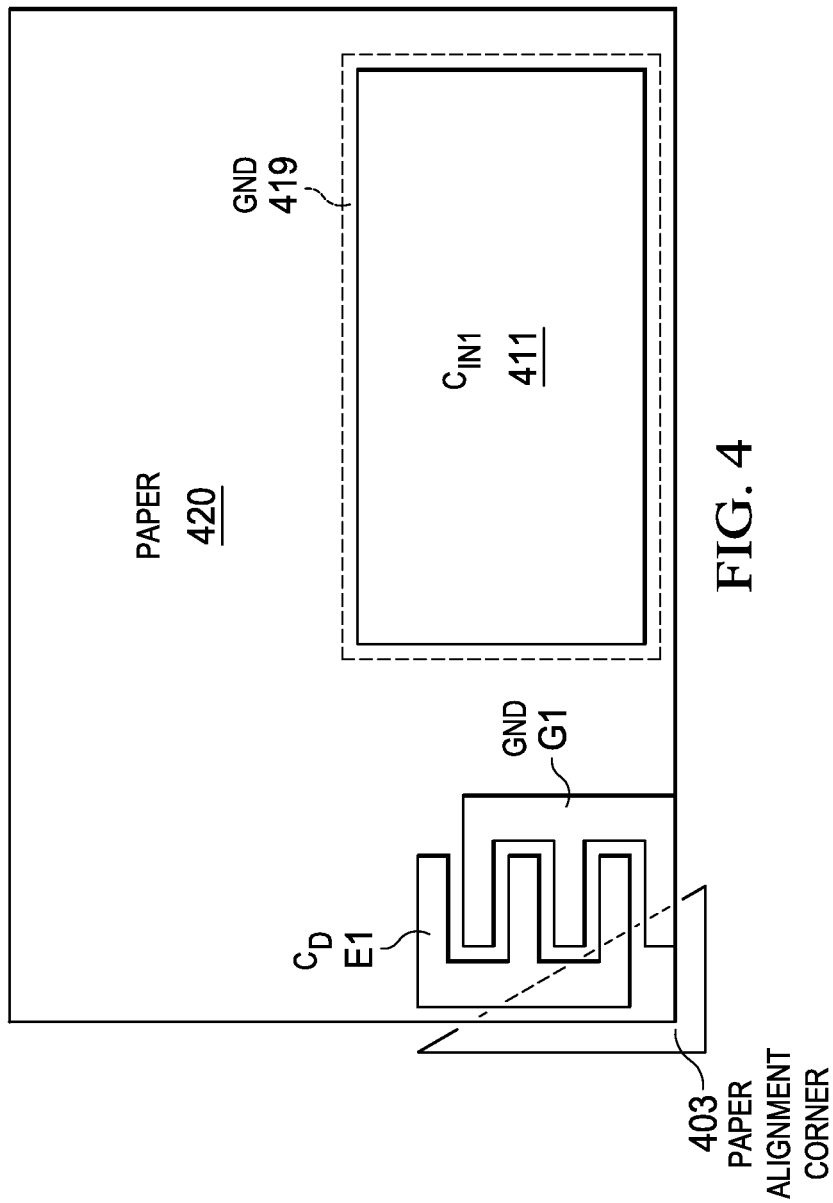
FIG. 4 illustrates and example embodiment of a paper tray with a capacitive sensing for measuring paper dielectric, including example inter-digitated (co-planar) capacitive and ground electrodes E1 and G1.

FIG. 4 illustrates an example capacitive sensor arrangement adapted for measuring paper stack height/page count based on capacitively sensing paper dielectric. Two capacitive sensors are used. A capacitive sensor/electrode CIN1 (411) is used as in the embodiment in FIGS. 3A/B. An inter-digitated (co-planar) capacitive sensor with capacitive/ground electrodes E1/G1 is used for measuring paper dielectric $\varepsilon_{paper}$.

Capacitive electrode CIN1 is operable for the capacitive measurement CA1,0 as described in connection with FIGS. 3A/3B—the capacitive measurement CA1,1 after an initial sheet feed (to obtain d1page) need not be taken. The CIN1 ground plane 419 can be disposed relative to CIN1 as described above in connection with FIGS. 3A/3B.

For capacitive sensing in connection with determining paper dielectric $\varepsilon_{paper}$, the inter-digitated (co-planar) capacitive/ground electrodes E1/G1 are disposed on the interior surface of a paper tray, for example at the alignment corner (in FIG. 3A, at 303). The sensor/ground electrodes E1/G1 are configured and oriented in an inter-digitated co-planar arrangement, preferably so that the projected fringe fields are confined to the typical thickness of one sheet of paper (approximately 100 microns).

Capacitance CD is measured with and without paper, to obtain the paper dielectric $\varepsilon_{paper}$.

For this embodiment, which does not require an initial sheet feed to determine paper thickness (i.e., d1page), page count requires knowledge of paper dielectric $\varepsilon_{paper}$ and paper sheet thickness. Paper thickness can be determined by, for example, separate input, or based on assumption, for example, a standard paper thickness of approximately 100 microns.

The Disclosure provided by this Description and the Figures sets forth example embodiments and applications, including associated operations and methods, that illustrate various aspects and features of the invention. Known circuits, functions and operations are not described in detail to avoid unnecessarily obscuring the principles and features of the invention. These example embodiments and applications can be used by those skilled in the art as a basis for design modifications, substitutions and alternatives to construct other embodiments, including adaptations for other applications. Accordingly, this Description does not limit the scope of the invention, which is defined by the Claims.

The invention claimed is:

1. A method of measuring paper characteristics for paper within a paper tray using capacitive sensing, the paper tray including at least two capacitive sensors with respective capacitive electrodes CIN1 and CIN2, each with a ground plane at a paper tray bottom, with CIN1 and CIN2 at a top of the paper tray oriented relative to a width dimension of the paper in the paper tray such that the paper covers CIN1, and partially covers CIN2, with CIN2 having a length a2=a2p+a2a, where a2p is a portion of the CIN2 length a2 that is over the paper, and a2a is a portion of the CIN2 length a that is not over the paper, the method comprising with no paper in the paper tray, measuring a capacitance CA0=CIN1 to the ground plane;
with paper in the paper tray,
measuring a capacitance CA1=CIN1 to ground;
measuring a capacitance CA2=CIN2 to ground; and
determining CDIFF w=CA1*(1−a2p/a2)−CA0*(aa/a);
and
determining paper width based on:

$$a2=a2p+a2a$$

$$a2p=a2-a2a$$

$$a2a=(a2*CDIFF\ w)/(CA1-CA0)$$

with paper width corresponding to a percentage (a2p/a) of CIN2 covered by paper.

2. The method of claim 1, further comprising calibrating for tray thickness, sensor size/position and sensor ground plane position, based on CA0.

3. The method of claim 1, further including a third capacitive sensor CIN3 at the top of the paper tray, oriented relative to a length dimension of the paper in the paper tray such that the paper partially covers CIN3, with CIN3 having a length a3=a3p+a3a, where a3p is a portion of the CIN2 length a3 that is over the paper, and a3a is a portion of the CIN3 length a that is not over the paper, and further comprising:

measuring a capacitance CA1=CIN1 to ground;
measuring a capacitance CA3=CIN3 to ground; and
determining CDIFF I=CA1*(1−a3p/a3)−CA0*(a3a/a3);
and
determining paper length based on:

$$a3=a3p+a3a$$

$$a3p=a3-a3a$$

$$a3a=(a3*CDIFF\ I)/(CA1-CA0)$$

with paper length corresponding to a percentage (a2p/a) of CIN3 covered by paper.

4. The method of claim 1, further comprising determining page count by:
measuring capacitance CA1,0

$$CA1,0 = (CAIR^{-1} + CPAPER^{-1})^{-1} = \left[\frac{1}{CA0} + \frac{dp}{\varepsilon 0 A}\left(\frac{1}{\varepsilon P} - \frac{1}{\varepsilon A}\right)\right]^{-1}$$

where $$CA_0 = k*\varepsilon_0*\varepsilon_A*\frac{A}{d} \quad CA_0 = k*\varepsilon_0*\varepsilon_A*\frac{A}{d}$$

$$CAIR = k*\varepsilon_0*\varepsilon_A*\frac{A}{d-dp}$$

$$CPAPER = k*\varepsilon_0*\varepsilon_P*\frac{A}{dp}$$

and where $\varepsilon_A$ is the dielectric constant of the air, $\varepsilon_p$ is the dielectric constant of paper, k accounts for fringing, A is sensor area; and determining dp as the total thickness of paper between sensor CIN1 and ground (total stack height), where da is the total thickness of air between the sensor and ground, so that d=dp+da, and da=d−dp feeding one page of paper d1page, and measuring capacitance CA1,1 where $$CA1,1 = \left[\frac{1}{CA0} + \frac{(dp-d1page)}{\varepsilon 0 * A}\left(\frac{1}{\varepsilon P} - \frac{1}{\varepsilon A}\right)\right]^{-1}$$

determining d1page; and
determining page count=dp/(d1page).

5. The method of claim 1, further comprising determining paper dielectric $\varepsilon_p$ according to:

$$1\Big/\varepsilon_{paper}\frac{d\varepsilon_{air}+(nw-d)\varepsilon_{eff}}{nw\,\varepsilon_{eff}\varepsilon_{air}}$$

where $\varepsilon_{eff}$ is the average dielectric between CIN1 and GND; n=number of pages, w=sheet thickness (d1page), and stack height=nw (dp); and (d) is the distance between the capacitive electrode CIN1 and GND.

6. The method of claim 1, wherein the paper tray includes a capacitive sensor with co-planar interdigitated capacitive E1 and ground G1 electrodes (together the E1/G1 interdigitated electrodes, disposed in the paper tray such that paper contacts the E1/G1 electrodes, the E1/G1 electrodes configured such that during capacitive sensing a fringing electric field is substantially confined to one sheet of paper, the method further comprising:

measuring capacitance CD_nopaper with the E1/G1 electrodes with no paper present;
measuring capacitance CD_paper with the E1/G1 electrodes with paper present;
determining paper dielectric $\varepsilon_p$ based on CD_nopaper and CD_paper, and a thickness w of one sheet of paper.

7. A system for measuring paper characteristics for paper within a paper tray using capacitive sensing, comprising:
the paper tray including at least two capacitive sensors with respective capacitive electrodes CIN1 and CIN2, each with a ground plane at a paper tray bottom, with CIN1 and CIN2 at a top of the paper tray
CIN1 and CIN2 oriented relative to a width dimension of the paper in the paper tray such that the paper covers CIN1, and partially covers CIN2, with CIN2 having a length a2=a2p+a2a, where a2p is a portion of the CIN2 length a2 that is over the paper, and a2a is a portion of the CIN2 length a that is not over the paper;
a capacitance-to-digital converter (CDC) configured to acquire capacitance measurements from the capacitive sensors, and to convert capacitance measurements into sensor date representative of paper width;
the CDC configured to acquire capacitance measurements based on:
  with no paper in the paper tray, measuring a capacitance CA0=CIN1 to the ground plane, and
  with paper in the paper tray,
    measuring a capacitance CA1=CIN1 to ground,
    measuring a capacitance CA2=CIN2 to ground; and
the CDC is configured to convert these capacitance measurements into sensor data for:
  determining CDIFF_w=CA1*(1−a2p/a2)−CA0*(aa/a), and
  determining paper width based on:

a2=a2p+a2a, a2p=a2−a2a, a2a=(a2*CDIFF_w)/(CA1−CA0);

with paper width corresponding to a percentage (a2p/a) of CIN2 covered by paper.

8. The system of claim 7, wherein the CDC is configured to convert the capacitance measurements CA0 into sensor data for calibrating for tray thickness, sensor size/position and sensor ground plane position.

9. The system of claim 7, further including a third capacitive sensor CIN3 at the top of the paper tray, oriented relative to a length dimension of the paper in the paper tray such that the paper partially covers CIN3, with CIN3 having a length a3=a3p+a3a, where a3p is a portion of the CIN2 length a3 that is over the paper, and a3a is a portion of the CIN3 length a that is not over the paper, and wherein:
  the CDC is configured to acquire capacitance measurements, including:
    measuring a capacitance CA1=CIN1 to ground, and
    measuring a capacitance CA3=CIN3 to ground; and
  the CDC is configured to convert these measurements into sensor data for determining paper length based on determining CDIFF_l=CA1*(1−a3p/a3)−CA0*(a3a/a3),
  where, a3=a3p+a3a, a3p=a3−a3a, and a3a=(a3*CDIFF_l)/(CA1−CA0);

with paper length corresponding to a percentage (a2p/a) of CIN3 covered by paper.

10. The system of claim 7, wherein:
the CDC is configured to convert capacitance measurements CA0 into sensor data for determining page count based on:
determining capacitance CA1,0

$$CA1,0 = (CAIR^{-1} + CPAPER^{-1})^{-1} = \left[\frac{1}{CA0} + \frac{dp}{\varepsilon 0 A}\left(\frac{1}{\varepsilon P} - \frac{1}{\varepsilon A}\right)\right]^{-1}$$

where

-continued $$CA_0 = k*\varepsilon_0*\varepsilon_A*\frac{A}{d} CA_0 = k*\varepsilon_0*\varepsilon_A*\frac{A}{d}$$

$$CAIR = k*\varepsilon_0*\varepsilon_A*\frac{A}{d-dp}$$

$$CPAPER = k*\varepsilon_0*\varepsilon_P*\frac{A}{dp}$$

and where $\varepsilon_A$ is the dielectric constant of the air, $\varepsilon_p$ is the dielectric constant of paper, k accounts for fringing, A is sensor area; and
determining dp as the total thickness of paper between sensor CIN1 and ground (total stack height), where da is the total thickness of air between the sensor and ground, so that d=dp+da, and da=d−dp;
feeding one page of paper d1page, and determining capacitance CA1,1, $$CA1,1 = \left[\frac{1}{CA0} + \frac{(dp-d1page)}{\varepsilon 0*A}\left(\frac{1}{\varepsilon P} - \frac{1}{\varepsilon A}\right)\right]^{-1}$$

determining d1page; and
determining page count=dp/(d1page).

11. The system of claim 7, wherein:
the CDC is configured to provide sensor data for determining paper dielectric $\varepsilon_p$ according to:

$$1\big/\varepsilon_{paper} \frac{d\varepsilon_{air} + (nw-d)\varepsilon_{eff}}{nw\,\varepsilon_{eff}\varepsilon_{air}}$$

where $\varepsilon_{eff}$ is the average dielectric between CIN1 and GND; n=number of pages, w=sheet thickness (d1page), and stack height=nw (dp); and (d) is the distance between the capacitive electrode CIN1 and GND.

12. The system of claim 7, wherein the paper tray includes a capacitive sensor with co-planar interdigitated capacitive E1 and ground G1 electrodes (together the E1/G1 interdigitated electrodes, disposed in the paper tray such that paper contacts the E1/G1 electrodes, the E1/G1 electrodes configured such that during capacitive sensing a fringing electric field is substantially confined to one sheet of paper, and wherein:
  the CDC is configured to acquire capacitance measurements
    CD_nopaper with the E1/G1 electrodes with no paper present, and
    CD_paper with the E1/G1 electrodes with paper present; and
  the CDC is configured to provide sensor data for determining paper dielectric $\varepsilon_p$ based on CD_nopaper and CD_paper, and a thickness w of one sheet of paper.

13. A capacitance-to-digital converter (CDC) for use in a system for measuring paper characteristics for paper within a paper tray using capacitive sensing, the paper tray including at least two capacitive sensors with respective capacitive electrodes CIN1 and CIN2, each with a ground plane at a paper tray bottom, with CIN1 and CIN2 at a top of the paper tray, and with CIN1 and CIN2 oriented relative to a width dimension of the paper in the paper tray such that the paper covers CIN1, and partially covers CIN2, with CIN2 having a length a2=a2p+a2a, where a2p is a portion of the CIN2 length a2 that is over the paper, and a2a is a portion of the CIN2 length a that is not over the paper, the CDC comprising:
  acquisition circuitry configured to acquire capacitance measurements, including:
    with no paper in the paper tray, a capacitance CA0=CIN1 to the ground plane, and
    with paper in the paper tray,
      a capacitance CA1=CIN1 to ground,
      a capacitance CA2=CIN2 to ground; and
  conversion circuitry configured to convert these capacitance measurements into sensor data for:
    determining CDIFF_w=CA1*(1−a2p/a2)−CA0*(aa/a), and
    determining paper width based on:

$$a2=a2p+a2a,$$

$$a2p=a2-a2a,$$

$$a2a=(a2*CDIFF\_w)/(CA1-CA0);$$

with paper width corresponding to a percentage (a2p/a) of CIN2 covered by paper.

14. The CDC of claim 13, wherein:
the conversion circuitry is configured to convert the capacitance measurements CA0 into sensor data for calibrating for tray thickness, sensor size/position and sensor ground plane position.

15. The CDC of claim 13, further including a third capacitive sensor CIN3 at the top of the paper tray, oriented relative to a length dimension of the paper in the paper tray such that the paper partially covers CIN3, with CIN3 having a length a3=a3p+a3a, where a3p is a portion of the CIN2 length a3 that is over the paper, and a3a is a portion of the CIN3 length a that is not over the paper, and wherein:
  the acquisition circuitry is configured to acquire capacitance measurements:
    a capacitance CA1=CIN1 to ground, and
    a capacitance CA3=CIN3 to ground; and
  the conversion circuitry is configured to convert these measurements into sensor data for determining paper length based on determining CDIFF_l=CA1*(1−a3p/a3)−CA0*(a3a/a3),
  where, $$a3=a3p+a3a,$$

$$a3p=a3-a3a, \text{ and}$$

$$a3a=(a3*CDIFF\_l)/(CA1-CA0);$$

with paper length corresponding to a percentage (a2p/a) of CIN3 covered by paper.

16. The CDC of claim 13, wherein:
the conversion circuitry is configured capacitance measurements CA0 into sensor data for determining page count based on:

determining capacitance CA1,0

$$CA1,0 = (CAIR^{-1} + CPAPER^{-1})^{-1} = \left[\frac{1}{CA0} + \frac{dp}{\varepsilon 0 A}\left(\frac{1}{\varepsilon P} - \frac{1}{\varepsilon A}\right)\right]^{-1}$$

where $$CA_0 = k*\varepsilon_0*\varepsilon_A*\frac{A}{d} CA_0 = k*\varepsilon_0*\varepsilon_A*\frac{A}{d}$$

$$CAIR = k*\varepsilon_0*\varepsilon_A*\frac{A}{d-dp}$$

$$CPAPER = k*\varepsilon_0*\varepsilon_P*\frac{A}{dp}$$

and where $\varepsilon_A$ is the dielectric constant of the air, $\varepsilon_p$ is the dielectric constant of paper, k accounts for fringing, A is sensor area; and
determining dp as the total thickness of paper between sensor CIN1 and ground (total stack height), where da is the total thickness of air between the sensor and ground, so that d=dp+da, and da=d−dp;
feeding one page of paper d1page, and determining capacitance CA1,1, $$CA1,1 = \left[\frac{1}{CA0} + \frac{(dp-d1page)}{\varepsilon 0*A}\left(\frac{1}{\varepsilon P} - \frac{1}{\varepsilon A}\right)\right]^{-1}$$

determining d1page; and
determining page count=dp/(d1page).

17. The system of claim 7, wherein:
the conversion circuitry is configured to provide sensor data for determining paper dielectric $\varepsilon_p$ according to:

$$1/\varepsilon_{paper} \frac{d\varepsilon_{air} + (nw-d)\varepsilon_{eff}}{nw\varepsilon_{eff}\varepsilon_{air}}$$

where $\varepsilon_{eff}$ is the average dielectric between CIN1 and GND; n=number of pages, w=sheet thickness (d1page), and stack height=nw (dp); and (d) is the distance between the capacitive electrode CIN1 and GND.

18. The CDC of claim 13, wherein the paper tray includes a capacitive sensor with co-planar interdigitated capacitive E1 and ground G1 electrodes (together the E1/G1 interdigitated electrodes, disposed in the paper tray such that paper contacts the E1/G1 electrodes, the E1/G1 electrodes configured such that during capacitive sensing a fringing electric field is substantially confined to one sheet of paper, and wherein:
  the acquisition circuitry is configured to acquire capacitance measurements CD_nopaper with the E1/G1 electrodes with no paper present, and CD_paper with the E1/G1 electrodes with paper present; and
  the conversion circuitry is configured to provide sensor data for determining paper dielectric $\varepsilon_p$ based on CD_nopaper and CD_paper, and a thickness w of one sheet of paper.

* * * * *